Patented Dec. 31, 1946

2,413,496

UNITED STATES PATENT OFFICE 2,413,496

PRODUCTION OF VINYL CYANIDE

Howard Donovan Green, Pasadena, and Donald Stinson Taylor, Monrovia, Calif., assignors to E. I. du Pont de Nemours & Company, Wilmington, Del., a corporation of Delaware No Drawing. Application July 4, 1944, Serial No. 543,490

9 Claims. (Cl. 260—464)

This invention relates to the manufacture of vinyl cyanide by the reaction of hydrocyanic acid with acetylene and, more particularly, to carrying out that reaction in the vapor phase in the presence of a suitable catalyst.

The production of vinyl cyanide by the vapor phase catalytic reaction between acetylene and hydrocyanic acid is described in the German Patent 559,734, issued September 23, 1932. This process may be operated simply by passing a mixture of acetylene and hydrocyanic acid over a suitable catalyst at a temperature of 350 to 700° C. Suitable catalysts for this reaction include a material having a high surface activity such as activated carbon, silica gel or the like, or alkali metal cyanides, which may be supported on a solid material of high surface activity or on a material of little or no surface activity, or combinations of these. A preferred catalyst for the reaction is a carbonaceous material such as charcoal or other suitable solid support which is impregnated with an alkali metal cyanide such as sodium cyanide or potassium cyanide. Another preferred catalyst is alumina impregnated with the alkali metal cyanide.

An object of the present invention is to improve the above-described catalytic process for producing vinyl cyanide. A further object is to effect an increase in the proportion of gas reacted during contact with the catalyst. Another object is to increase the activity of the catalyst. Another object is to increase the effective life of the catalyst. Other objects will be apparent from the following description of our invention.

The above-mentioned objects may be attained in accordance with the present invention by adding to the reaction mixture of hydrocyanic acid and acetylene, with or without a diluent gas, a small amount of water vapor, about 0.1 to 5% by volume of the initial reaction mixture and passing the resulting mixture over the catalyst at a temperature within the range of 350 to 700° C. We have found that such addition of water vapor to the reaction mixture has a number of advantages. It increases the activity of the catalyst and increases the amount of hydrocyanic acid converted to vinyl cyanide. Also, by the use of water vapor, the catalyst is maintained at a high degree of activity for a longer time. Also, whereas in operation without the water vapor, the particles of the catalyst bed tend to become cemented together causing difficulties in removing the catalyst at the end of an operation, we have found that when water vapor is used in accordance with the present invention, this cementing of the catalyst particles is prevented or to a large extent inhibited, so that subsequent removal of the catalyst is made easy.

While the proportion of water vapor may be varied from about 0.1 to 5% by volume in the reaction mixture, we have obtained the best results, e. g., maximum activation of the catalyst, within the range of about 0.5 to 1.2% by volume.

In a preferred mode of practicing our invention, we form a mixture of water vapor, hydrocyanic acid vapor with acetylene, and a diluent gas (which may be, for example, nitrogen, natural gas, or hydrogen) in the proportions of about 2 volumes of acetylene and about 7 volumes of diluent gas for each volume of hydrocyanic acid and about 0.5 to 1.5% by volume of water vapor. This mixture is passed through a bed of catalyst which consists of granular wood charcoal impregnated with an alkali metal cyanide or a mixture of alkali metal cyanides, i. e., the cyanides of sodium, potassium, lithium, cesium or rubidium. The temperature is controlled so that the temperature within the catalyst bed is maintained at 500 to 600° C. The off-gases from the reaction are cooled and condensed and from the resulting product pure vinyl cyanide is recovered by distillation.

The following examples further illustrate the invention:

Example 1

A gaseous mixture containing about 10% by volume of hydrocyanic acid and, for each volume of hydrocyanic acid, 2 volumes of acetylene and 7 volumes of natural gas (as diluent) was passed through a catalyst bed at a temperature of 500 to 600° C. The catalyst was granular wood charcoal impregnated with sodium cyanide. Several runs of more than 20 hours duration were carried out and, except for one run, water vapor was added in varying amounts to the reaction mixture before contact with the catalyst. The following results were obtained:

| Run | A | B | C | D |
|---|---|---|---|---|
| Vol. per cent $H_2O$ | 0.0 | 0.2 | 0.8 | 1.4 |
| Per cent HCN reacting: | | | | |
| After 1 hr | 80 | 75 | 90 | 89 |
| After 10 hrs | 49 | 74 | 69 | 65 |
| After 20 hrs | 30 | 46 | 57 | 51 |

Example 2

The procedure of Example 1 was followed, using a lot of the same kind of catalyst which had a lower degree of activity. The following results were obtained:

| Run | A | B | C | D | E |
|---|---|---|---|---|---|
| Vol. per cent H₂O | 0.0 | 0.6 | 1.0 | 1.4 | 2.1 |
| Per cent HCN reacting: | | | | | |
| After 1 hr | 32 | 48 | 57 | 47 | 48 |
| After 10 hrs | 40 | 49 | 48 | 44 | 44 |
| After 20 hrs | 26 | 42 | 42 | ----- | 38 |

*Example 3*

The method of Example 1 was followed, except that the gas mixture contained about 3.5% by volume of hydrocyanic acid and, for each volume of hydrocyanic acid, 3 volumes of acetylene and 24 volumes of natural gas. After 60 hours of operation, the following results were obtained:

| Run | A | B | C | D | E |
|---|---|---|---|---|---|
| Vol. per cent H₂O | 0.0 | 0.2 | 0.6 | 1.0 | 2.3 |
| Per cent HCN reacting: | | | | | |
| After 1 hr | 33 | 43 | 40 | 40 | 60 |
| After 10 hrs | 33 | 60 | 43 | 43 | 53 |
| After 30 hrs | 17 | 50 | 43 | 37 | 33 |
| After 60 hrs | 10 | 40 | ----- | 33 | 30 |

The above examples show the effect of the addition of water vapor in increasing the amount of hydrocyanic acid reacting to form vinyl cyanide. This effect on catalyst activity is most pronounced when the catalyst has been in use for some time, and it is apparent that the presence of the water vapor prevents or inhibits catalyst deterioration.

In carrying out this reaction in accordance with our invention, the water vapor may be added to the reaction mixture before or during its contact with the catalyst by any suitable means. This may be done, for example, by contacting the reaction mixture, or a component thereof, with water at a suitable temperature and pressure before bringing it into the reactor. If desired, any other method of introducing the water vapor which will be apparent to the skilled engineer may be utilized, for example by introducing a stream of water or steam into the reactor in controlled amount so as to mix with the reacting gases before contact or during contact with the catalyst.

Catalysts suitable for practicing our invention are those made by coating or impregnating solid materials which are heat resistant at the reaction temperatures utilized with one or more of the alkali metal cyanides or with alkali metal compounds reactive with hydrocyanic acid to form the cyanides. Examples of suitable catalyst supports for this purpose are carbonaceous catalysts, such as vegetable charcoal; coke; or activated carbon; silica, including silica gel; and alumina, including alumina gel. The invention is not restricted to these particular materials for the catalyst support, as any material which is substantially nonreactive with the cyanide and with the reacting gases and is heat resistant at the reaction temperatures utilized may be used. The catalyst support may be in any desired conventional form, whether as massive pieces, lumps, granules, or in a state of fine subdivision. In place of the alkali metal cyanides, we may use alkali metal oxides, hydroxides, carbonates, or alkali metal salts of organic acids containing less than 6 carbon atoms. Such alkali metal cyanide compounds are readily converted to the cyanides by the hydrocyanic acid present under the reaction conditions. We may also use free alkali metals, which likewise are converted to the cyanides. In other words, we may use any alkali metal substance which, in its stable form, in the presence of hydrocyanic acid under the conditions of the process, exists chiefly as alkali metal cyanide.

We claim:

1. In a process for the production of vinyl cyanide, which comprises reacting hydrocyanic acid with acetylene in the vapor phase at a temperature of 350 to 700° C. in the presence of a solid catalyst for the reaction comprising a compound selected from the group consisting of alkali metal cyanides and alkali metal compounds capable of reacting with hydrocyanic acid to form alkali metal cyanides, the improvement which consists in adding a relatively small amount of water vapor to the reaction mixture.

2. In a process for the production of vinyl cyanide, which comprises reacting hydrocyanic acid with acetylene in the vapor phase in the presence of a catalyst for the reaction comprising a compound selected from the group consisting of alkali metal cyanides and alkali metal compounds capable of reacting with hydrocyanic acid to form alkali metal cyanides at a temperature of 350 to 700° C., the improvement which consists in adding about 0.1 to 5% by volume of water vapor to the reaction mixture.

3. In a process for the production of vinyl cyanide, which comprises reacting hydrocyanic acid with acetylene in the vapor phase in the presence of a catalyst for the reaction comprising a compound selected from the group consisting of alkali metal cyanides and alkali metal compounds capable of reacting with hydrocyanic acid to form alkali metal cyanides at a temperature of 350 to 700° C., the improvement which consists in adding 0.1 to 1.5% by volume of water vapor to the reaction mixture.

4. In a process for the production of vinyl cyanide, which comprises reacting hydrocyanic acid with acetylene in the vapor phase at a temperature of about 500 to 600° C., in the presence of a catalyst comprising at least one alkali metal cyanide, the improvement which consists in adding about 0.1 to 5% by volume of water vapor to the reaction mixture.

5. In a process for the production of vinyl cyanide, which comprises reacting hydrocyanic acid with acetylene in the vapor phase at a temperature of about 500 to 600° C., in the presence of a catalyst comprising at least one alkali metal cyanide supported on a granular solid material, the improvement which consists in adding 0.1 to 1.5% by volume of water vapor to the reaction mixture.

6. In a process for the production of vinyl cyanide, which comprises reacting hydrocyanic acid with acetylene in the vapor phase at a temperature of about 500 to 600° C. in the presence of a catalyst comprising a substance selected from the group consisting of the alkali metals, the alkali metal oxides, carbonates, and cyanides, and the alkali metal salts of organic acids having less than 6 carbon atoms supported on a granular solid material, the improvement which consists in adding 0.1 to 1.5% by volume of water vapor to the reaction mixture.

7. In a process for the production of vinyl cyanide, which comprises reacting hydrocyanic acid with acetylene in the vapor phase at a temperature of about 500 to 600° C., in the presence of a catalyst comprising at least one alkali metal substance which, under the aforesaid conditions, exists as alkali metal cyanide supported on a granular solid material, the improvement which consists in adding 0.1 to 1.5% by volume of water vapor to the reaction mixture.

8. In a process for the production of vinyl cyanide, which comprises reacting hydrocyanic acid with acetylene in the vapor phase at a temperature of about 500 to 600° C., in the presence of a catalyst comprising granular vegetable charcoal impregnated with at least one alkali metal cyanide, the improvement which consists in adding 0.1 to 1.5% by volume of water vapor to the reaction mixture.

9. In a process for the production of vinyl cyanide, which comprises reacting hydrocyanic acid with acetylene in the vapor phase at a temperature of about 500 to 600° C., in the presence of a catalyst comprising alumina impregnated with at least one alkali metal cyanide, the improvement which consists in adding 0.1 to 1.5% by volume of water vapor to the reaction mixture.

HOWARD DONOVAN GREEN.
DONALD STINSON TAYLOR.